(12) United States Patent
Wu et al.

(10) Patent No.: US 8,885,729 B2
(45) Date of Patent: Nov. 11, 2014

(54) LOW-LATENCY VIDEO DECODING

(75) Inventors: Yongjun Wu, Bellevue, WA (US); Gang Ji, Bothell, WA (US); Shyam Sadhwani, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 996 days.

(21) Appl. No.: 12/966,914

(22) Filed: Dec. 13, 2010

(65) Prior Publication Data

US 2012/0147973 A1   Jun. 14, 2012

(51) Int. Cl.
| | |
|---|---|
| H04N 11/02 | (2006.01) |
| H04N 19/103 | (2014.01) |
| H04N 19/44 | (2014.01) |
| H04N 19/42 | (2014.01) |
| H04N 19/70 | (2014.01) |
| H04N 19/156 | (2014.01) |

(52) U.S. Cl.
CPC ... *H04N 19/00884* (2013.01); *H04N 19/00018* (2013.01); *H04N 19/00533* (2013.01); *H04N 19/00478* (2013.01); *H04N 19/00206* (2013.01)
USPC .................. 375/240.25; 375/240.01

(58) Field of Classification Search
CPC .................. H04N 19/00884; H04N 19/00484; H04N 19/00533; H04N 19/00018; H04N 19/00478; H04N 19/0049; H04N 21/44004; H04N 19/0021
USPC .......................... 375/240.01-240.29; 382/233
See application file for complete search history.

(56) References Cited

U.S. PATENT DOCUMENTS

| | | |
|---|---|---|
| 4,309,754 A | 1/1982 | Dinwiddie, Jr. |
| 4,642,756 A | 2/1987 | Sherrod |
| 5,465,335 A | 11/1995 | Anderson |

(Continued)

FOREIGN PATENT DOCUMENTS

| | | |
|---|---|---|
| CN | 1366775 | 8/2002 |
| CN | 1960472 | 5/2007 |

(Continued)

OTHER PUBLICATIONS

De Neve et al., "Real-Time BSD-driven Adaptation Along the Temporal Axis of H.264/AVC Bitstreams," *Advances in Multimedia Information Processing*, pp. 131-140 (2006).

(Continued)

*Primary Examiner* — Sath V Perungavoor
*Assistant Examiner* — Nathnael Aynalem
(74) *Attorney, Agent, or Firm* — Timothy Churna; Kate Drakos; Micky Minhas (57) ABSTRACT

Techniques and tools for reducing latency in video decoding for real-time communication applications that emphasize low delay. For example, a tool such as a video decoder selects a low-latency decoding mode. Based on the selected decoding mode, the tool adjusts output timing determination, picture boundary detection, number of pictures in flight and/or jitter buffer utilization. For low-latency decoding, the tool can use a frame count syntax element to set initial output delay for a decoded picture buffer, and the tool can use auxiliary delimiter syntax elements to detect picture boundaries. To further reduce delay in low-latency decoding, the tool can reduce number of pictures in flight for multi-threaded decoding and reduce or remove jitter buffers. The tool receives encoded data, performs decoding according to the selected decoding mode to reconstruct pictures, and outputs the pictures for display.

20 Claims, 7 Drawing Sheets

(56) References Cited

U.S. PATENT DOCUMENTS

| | | | |
|---|---|---|---|
| 5,861,920 A | 1/1999 | Mead et al. | |
| 5,909,559 A | 6/1999 | So | |
| 6,002,801 A | 12/1999 | Strongin et al. | |
| 6,006,303 A | 12/1999 | Barnaby et al. | |
| 6,105,048 A | 8/2000 | He | |
| 6,219,502 B1 | 4/2001 | Osari et al. | |
| 6,249,288 B1 | 6/2001 | Campbell | |
| 6,278,691 B1 | 8/2001 | Ohyama et al. | |
| 6,298,166 B1 | 10/2001 | Ratnakar et al. | |
| 6,427,058 B1 | 7/2002 | Akiba et al. | |
| 6,438,169 B1 * | 8/2002 | Takashima et al. | 375/240.05 |
| 6,574,279 B1 | 6/2003 | Vetro et al. | |
| 6,782,368 B2 | 8/2004 | Fujii et al. | |
| 6,823,016 B1 | 11/2004 | Nguyen et al. | |
| 6,963,347 B1 | 11/2005 | Selvaggi et al. | |
| 7,043,088 B2 | 5/2006 | Chiu et al. | |
| 7,072,404 B2 | 7/2006 | Itokawa | |
| 7,085,322 B2 | 8/2006 | Ngai et al. | |
| 7,099,389 B1 | 8/2006 | Yu et al. | |
| 7,116,714 B2 | 10/2006 | Hannuksela | |
| 7,130,526 B2 | 10/2006 | Abelard et al. | |
| 7,289,047 B2 | 10/2007 | Nagori | |
| 7,366,236 B1 | 4/2008 | Winger | |
| 7,370,325 B1 | 5/2008 | Hull et al. | |
| 7,424,730 B2 | 9/2008 | Chou | |
| 7,573,407 B2 | 8/2009 | Reznik | |
| 7,653,128 B2 | 1/2010 | Shibata et al. | |
| 7,735,087 B2 | 6/2010 | Hayashi | |
| 7,787,539 B2 | 8/2010 | Chen | |
| 7,817,723 B2 | 10/2010 | Wiegand et al. | |
| 7,889,788 B2 | 2/2011 | Toma et al. | |
| 8,291,448 B2 * | 10/2012 | Pekonen et al. | 725/32 |
| 8,396,082 B2 * | 3/2013 | Hannuksela et al. | 370/473 |
| 2002/0036707 A1 | 3/2002 | Gu | |
| 2003/0185298 A1 | 10/2003 | Alvarez et al. | |
| 2003/0235251 A1 * | 12/2003 | Hsiun et al. | 375/245 |
| 2004/0117427 A1 | 6/2004 | Allen et al. | |
| 2004/0146109 A1 | 7/2004 | Kondo et al. | |
| 2004/0190617 A1 | 9/2004 | Shen et al. | |
| 2004/0208245 A1 | 10/2004 | MacInnis et al. | |
| 2005/0053157 A1 | 3/2005 | Lillevold | |
| 2005/0175091 A1 | 8/2005 | Puri et al. | |
| 2005/0180511 A1 | 8/2005 | Arafune et al. | |
| 2005/0289505 A1 | 12/2005 | Williams | |
| 2006/0002479 A1 | 1/2006 | Fernandes | |
| 2006/0056517 A1 | 3/2006 | MacInnis et al. | |
| 2006/0114995 A1 | 6/2006 | Robey et al. | |
| 2006/0126726 A1 | 6/2006 | Lin et al. | |
| 2006/0126744 A1 | 6/2006 | Peng et al. | |
| 2006/0133479 A1 | 6/2006 | Chen et al. | |
| 2006/0133770 A1 | 6/2006 | Shibata et al. | |
| 2006/0193383 A1 | 8/2006 | Alvarez et al. | |
| 2006/0204119 A1 | 9/2006 | Feng et al. | |
| 2006/0215754 A1 | 9/2006 | Buxton et al. | |
| 2006/0227872 A1 | 10/2006 | Mori et al. | |
| 2006/0233525 A1 | 10/2006 | Shibata et al. | |
| 2006/0239343 A1 | 10/2006 | Mohsenian | |
| 2006/0248516 A1 | 11/2006 | Gordon | |
| 2007/0030911 A1 | 2/2007 | Yoon | |
| 2007/0126853 A1 | 6/2007 | Ridge et al. | |
| 2007/0183507 A1 | 8/2007 | Maheshwari et al. | |
| 2007/0223595 A1 | 9/2007 | Hannuksela et al. | |
| 2007/0233989 A1 | 10/2007 | Garcia-Arellano et al. | |
| 2007/0286276 A1 | 12/2007 | Gartner et al. | |
| 2007/0291857 A1 | 12/2007 | Hussain | |
| 2007/0297501 A1 | 12/2007 | Hussain et al. | |
| 2008/0013620 A1 | 1/2008 | Hannuksela et al. | |
| 2008/0048894 A1 | 2/2008 | Ridge et al. | |
| 2008/0107184 A1 | 5/2008 | Katsavounidis et al. | |
| 2008/0123736 A1 * | 5/2008 | Sekiguchi et al. | 375/240.01 |
| 2008/0137736 A1 | 6/2008 | Richardson et al. | |
| 2008/0159408 A1 | 7/2008 | Degtyarenko | |
| 2008/0181308 A1 | 7/2008 | Wang et al. | |
| 2008/0187053 A1 | 8/2008 | Zhao et al. | |
| 2008/0225949 A1 | 9/2008 | Adachi et al. | |
| 2008/0304520 A1 | 12/2008 | Hannuksela et al. | |
| 2009/0002379 A1 | 1/2009 | Baeza et al. | |
| 2009/0003446 A1 | 1/2009 | Wu et al. | |
| 2009/0003447 A1 | 1/2009 | Christoffersen et al. | |
| 2009/0003451 A1 | 1/2009 | Lin et al. | |
| 2009/0010337 A1 * | 1/2009 | Wang | 375/240.16 |
| 2009/0109988 A1 * | 4/2009 | Musunuri et al. | 370/412 |
| 2009/0147859 A1 | 6/2009 | McGowan et al. | |
| 2009/0175548 A1 | 7/2009 | Fukuhara et al. | |
| 2010/0008418 A1 | 1/2010 | Wu et al. | |
| 2010/0061643 A1 | 3/2010 | Fukuhara et al. | |
| 2010/0158135 A1 | 6/2010 | Yin et al. | |
| 2010/0189182 A1 | 7/2010 | Hannuksela | |
| 2010/0195721 A1 | 8/2010 | Wu et al. | |
| 2011/0002376 A1 | 1/2011 | Ahmed et al. | |
| 2011/0002397 A1 | 1/2011 | Wang et al. | |
| 2011/0080940 A1 | 4/2011 | Bocharov et al. | |

FOREIGN PATENT DOCUMENTS

| | | |
|---|---|---|
| CN | 101051465 | 10/2007 |
| CN | 101313585 | 11/2008 |
| CN | 101569170 | 10/2009 |
| EP | 0 909 094 | 4/1999 |
| EP | 1 195 992 | 4/2002 |
| WO | WO 2006/096612 | 9/2006 |
| WO | WO 2006/134110 | 12/2006 |

OTHER PUBLICATIONS

MainConcept, "MainConcept™ Showcase 2.8," 4 pp. (downloaded from the World Wide Web on Apr. 6, 2011).

Narasimhan, "Contributions to Carriage of AVC in MPEG-2," ISO/IEC/JTC1/SC29/WG11, MPEG2003/m9448, 12 pp. (2003).

Schwarz et al., "Overview of the Scalable H.264/MPEG4-AVC Extension," *IEEE Int'l Conf. on Image Processing*, pp. 161-164 (Oct. 2006).

Segall et al., "Spatial Scalability Within the H.264/AVC Scalable Video Coding Extension," *IEEE Trans. on Circuits and Systems for Video Technology*, vol. 17, No. 9, pp. 1121-1135 (Sep. 2007).

Sullivan, "DirectX Video Acceleration Specification for H.264/AVC Decoding," 66 pp. (Dec. 2007—updated Dec. 2010).

Sullivan et al., "DirectX Video Acceleration Specification for H.264/MPEG-4 AVC Multiview Video Coding (MVC), Including the Stereo High Profile," 17 pp. (Mar. 2011).

Wiegand et al., "Introduction to the Special Issue on Scalable Video Coding—Standardization and Beyond," *IEEE Trans. on Circuits and Systems for Video Technology*, vol. 17, No. 9, pp. 1099-1102 (Sep. 2007).

ISO/IEC, "Text of ISO/IEC FCD 29199-2 (JPEG XR image coding—Specification)," ISO/IEC JTC 1/SC 29/WG 11 N4739, 173 pp. (Sep. 2008).

ISO/IEC, "Digital Compression and Coding of Continuous-tone Still Images," ISO DIS 10918-1, CCITT Recommendation T.81, 211 pp. (1992).

ITU, "Advanced video coding for generic audiovisual services," Recommendation ITU-T H.264, 676 pp. (Mar. 2010).

Marpe et al., "A Fast Renormalization Technique for H.264/MPEG4-AVC Arithmetic Coding," 14 pp. (2006).

Murata et al., "Fast 2D IDCT Implementation with Multimedia Instructions for a Software MPEG2 Decoder," *Int'l Conf. on Acoustics, Speech, and Signal Processing*, vol. 5, pp. 3105-3108 (May 1998).

Prada-Rojas et al,. "Towards a Component-based Observation of MPSoC," *IEEE*, pp. 542-549 (Sep. 2009).

SMPTE, "VC-1 Compressed Video Bitstream Format and Decoding Process," SMPTE 421M-2006, 493 pp. (Feb. 2006).

Sullivan et al., "Microsoft DirectX VA: Video Acceleration API/DDI," 88 pp. (2001).

Wang, "H.264 Baseline Video Implementation on the CT3400 Multi-core DSP," Cradle Technologies, 15 pp. (2006).

Wikipedia, "Motion JPEG," 4 pp., downloaded from the World Wide Web on Dec. 29, 2010.

(56) References Cited

OTHER PUBLICATIONS

Yadav et al., "Software-only Multiple Variable Length Decoding for Real-Time Video on MDSP," *Int'l Conf. on Consumer Electronics*, pp. 141-142 (Jan. 2005).

Youssef, "JPEG and MPEG Standards," 14 pp., downloaded from the World Wide Web on Dec. 29, 2010.

3rd Generation Partnership Project, "Multimedia telephony over IP Multimedia Subsystem (IMS); Optimization opportunities (Release 7)," 3GPP Technical Report TR 26.914 V7.0.0, 18 pp. (Mar. 2006).

Akramullah et al., "Parallelization of MPEG-2 Video Encoder for Parallel and Distributed Computing Systems," *IEEE*, pp. 834-837 (Aug. 1995).

ATI Technologies, Inc., "Introduction to H.264," 6 pp. (month unknown, 2005).

Azevedo et al., "A Highly Scalable Parallel Implementation of H.264," Transactions on High-Performance Embedded Architectures and Compilers, 25 pp. (Sep. 2009).

Chen et al., "Implementation of H.264 Encoder and Decoder on Personal Computers," *Journal of Visual Comm. and Image Representation*, 19 pp. (Apr. 2006).

Chen, "Synchronization and Control of Multi-threads for MPEG-4 Video Decoder," *IEEE 1999 Int'l Conf. on Consumer Electronics*, pp. 298-299 (Jun. 1999).

Dawson, "Coding for Multiple Cores on Xbox 360 and Microsoft Windows," 8 pp. (Aug. 2006) [Downloaded from the Internet on Jan. 22, 2007].

Duffy, "CLR Inside Out: Using Concurrency for Scalability," MSDN Magazine, 11 pp. (Sep. 2006) [Downloaded from the Internet on Jan. 22, 2007].

Foldoc.org, "priority scheduling," 1 p. (no. date) [Downloaded from the Internet on Jan. 26, 2007].

Foldoc.org, "multitasking," 1 p. (Document dated Apr. 24, 1998) [Downloaded from the Internet on Jan. 26, 2007].

Gerber et al., "Optimizing Video Encoding using Threads and Parallelism: Part 1—Threading a video codec," 3 pp., downloaded from Embedded.com, (Dec. 2009).

Huang et al., "Joint Algorithm/Code-Level Optimization of H.264 Video Decoder for Mobile Multimedia Applications," ICASSP, pp. 2189-2192 (Mar. 2008).

Intel Corp., "Intel's Next Generation Integrated Graphics Architecture—Intel® Graphics Media Accelerator X3000 and 3000," 14 pp. (Jul. 2006).

ISO/IEC, "Text of ISO/IEC 14496-10:2005/FPDAM3 Scalable Video Coding (in Integrated Form with ISO/IEC 14996-10)," ISO/IEC JTC 1/SC 29/WG 11 N8241, 552 pp. (Jul. 2006).

Jacobs et al., "Thread-Parallel MPEG-2, MPEG-4 and H.264 Video Encoders for SoC Multi-Processor Architectures," *IEEE Trans. on Consumer Electronics*, vol. 52, No. 1, pp. 269-275 (Feb. 2006).

Joint Collaborative Team on Video Coding, "Description of video coding technology proposal by Texas Instruments Inc.," JCTVC-A101, 45 pp. (Apr. 2010).

Kim et al., "Multi-thread VLIW processor architecture for HDTV decoding," *IEEE 2000 Custom Integrated Circuits Conf.*, pp. 559-562 (May 2000).

Loomis et al., "VC-1 Technical Overview," 7 pp. (Apr. 2006) [Downloaded from the Internet on Jan. 24, 2007].

Oehring et al., "MPEG-2 Video Decompression on Simultaneous Multithreaded Multimedia," *Int. Conf. on Parallel Architectures and Compilation Techniques (PACT '99)*, Newport Beach, CA (Oct. 1999).

Ostermann et al., "Video Coding with H.264/AVC: Tools, Performance, and Complexity," *IEEE Circuits and Systems Magazine*, pp. 7-28 (Aug. 2004).

Richardson, *H.264 and MPEG-4 Video Compression: Video Coding for Next-generation Multimedia*, Chapter 6, "H.264/MPEG4 Part 10," pp. 159-223 (Aug. 2003).

Sambe et al., "High-speed Distributed Video Transcoding for Multiple Rates and Formats," *IEICE Trans on Information and Systems*, vol. E88-D, Issue 8, pp. 1923-1931 (Aug. 2005).

SMPTE, "Proposed SMPTE Standard for Television: VC-1 Compressed Video Bitstream Format and Decoding Process," SMPTE 421M, pp. i-xx, 5-7, 23-27 (Aug. 2005).

Van Der Tol et al., "Mapping of MPEG-4 decoding on a flexible architecture platform," *Proceedings of the SPIE, Media Processors*, vol. 4674, 13 pp. (Jan. 2002).

Van Der Tol et al., "Mapping of H.264 decoding on a multiprocessor architecture," *Proceedings of the SPIE*, vol. 5022, pp. 707-718 (May 2003).

Wang, "[MP4-tech] [H.264] output timing, bumping process, missing HRD parameters," downloaded from World Wide Web, 3 pp. (document marked May 5, 2006).

ISO/IEC, "Information Technology—Coding of Audio-Visual Objects: Visual," ISO/IEC 14496-2, Committee Draft, 327 pp. (Mar. 1998).

ISO/IEC, "Information technology—Coding of moving pictures and associated audio for digital storage media at up to about 1,5 Mbit/s—Part 2: Video," ISO/IEC 11172-2, 122 pp. (Aug. 1993).

ITU-T Recommendation H.262, "Transmission of Non-Telephone Signals—Information Technology—Generic Coding of Moving Pictures and Associated Audio Information: Video," 218 pp. (Jul. 1995).

Park et al., "On high-level syntax for maximum DPB size and frame latency," JCTVC-G546, 4 pp. (Nov. 2011).

Park et al., "On high-level syntax for maximum DPB size and frame latency (JCTVC-G546)," 8 pp. (Nov. 2011).

Sullivan, "Proposed constraint on reordering latency," JCTVC-F541, 5 pp. (Jul. 2011).

Sullivan, "Proposed constraint on reordering latency (for further consideration of JCTVC-F541)," JCTVC-G779, 5 pp. (Nov. 2011).

Supplementary Search Report dated Aug. 4, 2014, from Chinese Patent Application No. 201110414227.7, 4 pp.

Second Office action dated Aug. 4, 2014, from Chinese Patent Application No. 201110414227.7, 8 pp.

\* cited by examiner

Figure 1 software 180 implementing one or more innovations for low-latency decoding

LOW-LATENCY VIDEO DECODING

BACKGROUND

Engineers use compression (also called source coding or source encoding) to reduce the bitrate of digital video. Compression decreases the cost of storing and transmitting video information by converting the information into a lower bitrate form. Decompression (also called decoding) reconstructs a version of the original information from the compressed form. A "codec" is an encoder/decoder system.

Over the last two decades, various video codec standards have been adopted, including the H.261, H.262 (MPEG-2) and H.263 standards and the MPEG-1 and MPEG-4 standards. More recently, the H.264 standard (sometimes referred to as AVC or 14496-10) and VC-1 standard have been adopted. For additional details, see representative versions of the respective standards. A video codec standard typically defines options for the syntax of an encoded video bitstream, detailing parameters that must be in the bitstream for a video sequence when particular features are used in encoding and decoding. In many cases, a video codec standard also provides details about the decoding operations a decoder should perform to achieve correct results in decoding.

A basic goal of compression is to provide good rate-distortion performance. So, for a particular bitrate, an encoder attempts to provide the highest quality of video. Or, for a particular level of quality/fidelity to the original video, an encoder attempts to provide the lowest bitrate encoded video. In practice, depending on the use scenario, considerations such as encoding time, encoding complexity, encoding resources, decoding time, decoding complexity, decoding resources, overall delay, and/or smoothness in playback also affect decisions made during encoding and decoding.

For example, consider use scenarios such as video playback from storage, video playback from encoded data streamed over a network connection, and video transcoding (from one bitrate to another bitrate, or one standard to another standard). At the encoder side, such applications may permit off-line encoding that is not at all time-sensitive. Therefore, an encoder can increase encoding time and increase resources used during encoding to find the most efficient way to compress video, and thereby improve rate-distortion performance. If a small amount of delay (e.g., 3-10 seconds at startup) is also acceptable at the decoder side, the encoder can further improve rate-distortion performance, e.g., by exploiting inter-picture dependencies from pictures farther ahead in a sequence.

For most video playback scenarios, at the decoder side, delay of 3-10 seconds or more is acceptable before playback begins, so long as playback is uninterrupted after it starts. Subject to this smooth playback constraint, the decoder is free to devote additional resources for multi-threaded decoding or multi-processor decoding. In fact, in some cases, a decoder can increase latency so as to allow more efficient utilization of decoding resources.

On the other hand, consider use scenarios such as remote desktop conferencing, surveillance video, video telephony and other real-time communication scenarios. Such applications are time-sensitive. Low latency between recording of input pictures and playback of output pictures is a key factor in performance. When encoding/decoding tools adapted for non-real-time communication are applied in real-time communication scenarios, overall latency is often unacceptably high. The delays that these tools introduce during encoding and decoding may improve performance for regular video playback, but they disrupt real-time communication.

SUMMARY

In summary, the detailed description presents techniques and tools for reducing latency in video decoding. The techniques and tools help reduce latency so as to improve responsiveness in real-time communication. For example, the techniques and tools reduce overall latency by removing or even eliminating buffering at various stages during decoding, which improves responsiveness but can cause a certain amount of loss in performance in other respects.

According to one aspect of the techniques and tools described herein, a tool such as a video decoder, real-time communication tool with a video decoder, or other tool with a video decoder selects a low-latency decoding mode, which is characterized by lower latency decoding compared to another decoding mode. Based at least in part on the selected decoding mode, the tool adjusts one or more aspects of decoding to facilitate low-latency decoding. For example, the tool adjusts output timing determination, picture boundary detection, number of pictures in flight and/or jitter buffer utilization. The tool receives encoded data in a bitstream for a video sequence and, with the video decoder, decodes at least some of the encoded data according to the selected decoding mode to reconstruct a picture. The tool then outputs the picture for display.

In the low-latency decoding mode, the output timing determination can use a frame count syntax element (if present) in the bitstream to set initial output delay for the decoded picture buffer (DPB) which is defined, for example, as in the H.264 standard. The frame count syntax element indicates a frame reordering delay. For example, the frame reordering delay is a maximum count of frames that can precede a given frame in coded order but follow the given frame in display order. In some implementations, the frame count syntax element is a num_reorder_frames syntax element signaled as a video usability information (VUI) parameter for a video sequence.

In comparison, the other decoding mode provides video playback with higher latency. In the other decoding mode, for example, output of pictures from a DPB begins when the DPB is full, so the initial output delay depends on the size of the DPB. Using a frame count syntax element to determine the initial output delay can allow output to start sooner by 5 or more frames (up to 16, in many cases).

In the low-latency decoding mode, picture boundary detection can use auxiliary delimiter syntax elements in the bitstream to find boundaries between pictures. In some implementations, the auxiliary delimiter syntax elements are network abstraction layer (NAL) units having a NAL unit type that designates them as picture boundary delimiters to the decoder. In comparison, the other decoding mode uses, for example, slice-layer syntax elements to detect picture boundaries, which adds delay due to buffering of one additional unit of slice-layer encoded data for picture boundary discovery.

In the low-latency decoding mode for multi-threaded decoding implementations, the number of pictures in flight can be reduced or even set to a single picture. In comparison, the other decoding mode permits multiple pictures in flight for multi-threaded decoding implementations, which improves processor utilization but adds delay and additional buffering of pictures.

In the low-latency decoding mode, utilization of one or more jitter buffers can be adjusted to favor overall latency reduction over smoothness of playback. For example, the jitter buffer is an input buffer (which normally stores encoded data before decoding so as to smooth fluctuations in delivery of the encoded data and/or fluctuations in bitrate between pictures), and decoding begins for a given picture as soon as the encoded data for the given picture is available in the input buffer. Or, the jitter buffer is an output buffer (which normally stores output from the decoding so as to smooth fluctuations in decoding complexity), and the output buffer is set to a minimum size or is bypassed completely. In comparison, in the other decoding mode, the input buffer and output buffer are set to favor smoothness of playback over overall latency reduction. For example, the input buffer is filled to a threshold fullness before decoding begins, and the output buffer stores 3-5 decoded pictures before display.

According to another aspect of the techniques and tools described herein, a tool such as a video encoder, real-time communication tool with a video encoder, or other tool with a video encoder selects an encoding mode that facilitates low-latency decoding. The tool adjusts one or more aspects of encoding based at least in part on the selected encoding mode, so as to facilitate low-latency decoding. For example, the tool adjusts encoding for output timing determination and/or picture boundary detection. The tool receives pictures for a video sequence and, with the video encoder, encodes the pictures according to the selected encoding mode to produce encoded data. The tool then outputs the encoded data in a bitstream, where the bitstream includes syntax elements that a decoder can use for low-latency decoding. Encoded data in the bitstream can be structured to facilitate low-latency decoding in other respects. For example, pictures can be encoded according to a group of pictures (GOP) arrangement such as I P P P I P P P . . . in which a picture with only intra-coded content (I picture) is followed by a picture with some forward-predicted content (P picture) that references a preceding picture, but no picture content references a later picture in display order.

According to another aspect of the techniques and tools described herein, a tool receives pictures for a video sequence and encodes the pictures to produce encoded data. The encoding can facilitate low-latency decoding by setting inter-picture dependencies that are consistent with a frame reordering delay. The encoding can also facilitate low-latency decoding by inserting auxiliary delimiter syntax elements in the bitstream, wherein each of the auxiliary delimiter syntax elements identifies a picture boundary. The tool outputs the encoded data in a bitstream, which includes a frame count syntax element that indicates the frame reordering delay and/or includes the auxiliary delimiter syntax elements.

According to another aspect of the techniques and tools described herein, a tool receives encoded data in a bitstream for a video sequence. The bitstream includes a frame count syntax element (e.g., in video usability information) that indicates a frame reordering delay. The bitstream also includes auxiliary delimiter syntax elements (e.g., as NAL units understood by the decoder to indicate picture boundaries). When the tool decodes encoded data to reconstruct pictures, the tool detects picture boundaries using the auxiliary delimiter syntax elements. The tool outputs pictures for display, where the initial output delay for a DPB is determined using the frame count syntax element. To further reduce latency, the tool can set a number of pictures in flight to one (thereby limiting how many pictures can be concurrently decoded) and/or set jitter buffer utilization to favor latency reduction over smoothness of playback.

The foregoing and other objects, features, and advantages of the invention will become more apparent from the following detailed description, which proceeds with reference to the accompanying figures.

DETAILED DESCRIPTION

The detailed description presents techniques and tools for reducing latency in video decoding. The techniques and tools can help reduce latency so as to improve responsiveness in real-time communication.

In video coding/decoding scenarios, some delay is inevitable between the time an input picture is received and the time the picture is played back. The picture is encoded by an encoder, delivered to a decoder and decoded by the decoder, and some amount of latency is caused by practical limitations on encoding resources, decoding resources and/or network bandwidth.

Other latency is avoidable, however. For example, latency might be introduced by an encoder and decoder to improve rate-distortion performance (e.g., to exploit inter-picture dependencies from pictures farther ahead in a sequence), to allow for more efficient utilization of processing capacity (e.g., to create more opportunities for multi-threading) or to make smooth playback more likely (e.g., by buffering more encoded data before decoding and buffering more decoded pictures after decoding). Such latency can be reduced, although there may be a penalty in terms of rate-distortion performance, processor utilization or playback smoothness.

With techniques and tools described herein, decoding latency is decreased by reducing or even eliminating delay at one or more different stages of decoding. For example, decoding latency is decreased by using one or more of the following features:

Initial output delay set from frame count syntax element. In some decoding systems, a decoder stores decoded pictures in a decoded picture buffer (DPB). The decoder may use the buffered pictures as reference pictures for motion compensation. By default, the decoder also delays output for display until the DPB is full. To reduce latency, the decoder can instead determine initial output delay for the DPB using a frame count syntax element. In this way, the decoder can speed up initial output from the DPB.

Picture boundary detection using auxiliary delimiter syntax elements. In some decoding systems, a decoder detects the boundary for a next picture in a bitstream by evaluating syntax elements for a portion (slice) of a picture, and determining that the portion is part of the next picture rather than the current picture. To reduce latency, the decoder can instead detect the picture boundary by scanning for a delimiter syntax element inserted at the picture boundary by an encoder. In this way, the decoder can speed up picture boundary discovery by avoiding buffering of slices of the next picture.

Reducing input and output buffers. In some decoding systems, a decoder stores encoded data in an input buffer before decoding (to smooth out fluctuations in delivery rate or bitrate) and stores decoded pictures in an output buffer (to smooth out fluctuations in decoding complexity). To reduce latency, the decoder can instead begin decoding for a given picture as soon as encoded data is available for the picture in the input buffer, and the decoder can eliminate the output buffer.

Limiting number of pictures in flight. In some decoding systems, a decoder uses multi-threading and concurrently performs decoding tasks for multiple pictures. This typically improves processor utilization but adds delay. To reduce latency, the decoder can reduce the number of pictures that are concurrently decoded or even limit decoding to a single picture at a time.

With these ways of decreasing decoding latency, delay can be improved for remote desktop conferencing, video telephony, video surveillance, web camera video and other real-time communication applications. Considering only latency, the ideal delay for real-time communication applications is 0-picture delay (one compressed picture in, one decoded/uncompressed picture out), which can be achieved with the above settings. Subject to the low-latency constraint, a decoder can still improve decoding performance by using multi-threading or multiple processing cores, but the low-latency constraint may limit such opportunities to exploit additional decoding resources.

In real-time communication scenarios, an encoder and decoder are usually part of an end-to-end communication system. The encoder makes encoding decisions consistent with low-latency decoding, even if the decisions are not specified in a standard or format, and the decoder expects video to be encoded accordingly. For some innovations described herein, an encoder inserts syntax elements in the bitstream to facilitate low-latency decoding. Alternatively, another processing tool could insert such syntax elements. Other innovations described herein need no such cooperation from an encoder or other processing tool to insert syntax elements that facilitate low-latency decoding.

Some of the innovations described herein are illustrated with reference to syntax elements and operations specific to the H.264 standard. For example, the frame count syntax element can be a num_reorder_frames syntax element in video usability information (VUI) for a video sequence. As another example, the delimiter syntax elements can be network abstraction layer (NAL) units having NAL unit type of 9. Such innovations can also be implemented for other standards or formats.

More generally, various alternatives to the examples described herein are possible. Certain techniques described with reference to flowchart diagrams can be altered by changing the ordering of stages shown in the flowcharts, by splitting, repeating or omitting certain stages, etc. The various aspects of latency reduction for video decoding can be used in combination or separately. Different embodiments use one or more of the described techniques and tools. Some of the techniques and tools described herein address one or more of the problems noted in the background. Typically, a given technique/tool does not solve all such problems.

I. Example Computing Environments.

Figure 1:
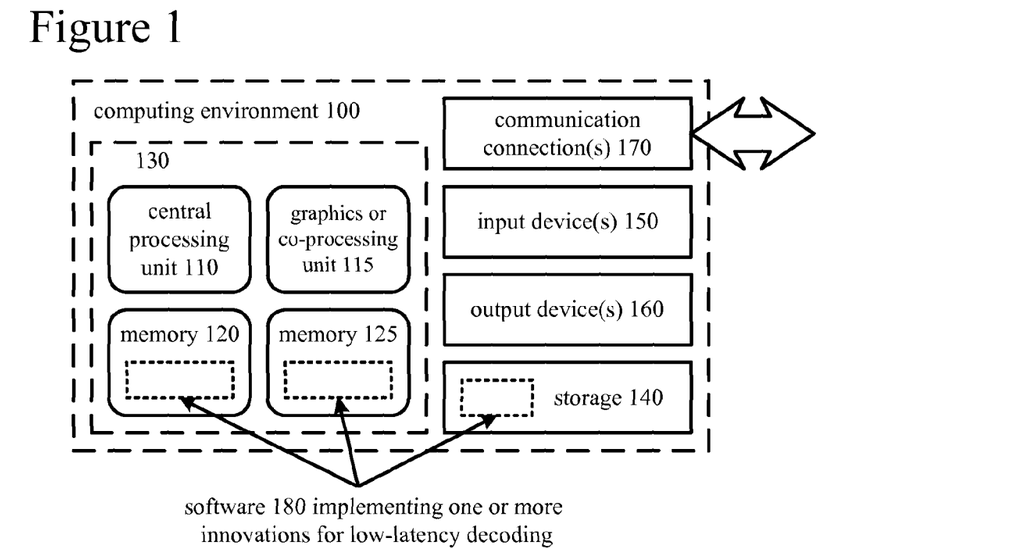
FIG. 1 is a diagram of an example computing environment in which some described embodiments can be implemented.

FIG. 1 illustrates a generalized example of a suitable computing environment (100) in which several of the described techniques and tools may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes one or more processing units (110, 115) and memory (120, 125). In FIG. 1, this most basic configuration (130) is included within a dashed line. The processing units (110, 115) execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 1 shows a central processing unit (110) as well as a graphics processing unit or co-processing unit (115). The memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for low-latency decoding, in the form of computer-executable instructions suitable for execution by the processing unit(s).

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The tangible storage (140) may be removable or non-removable, and includes magnetic disks, magnetic tapes or cassettes, CD-ROMs, DVDs, or any other medium which can be used to store information in a non-transitory way and which can be accessed within the computing environment (100). The storage (140) stores instructions for the software (180) implementing one or more innovations for low-latency decoding.

The input device(s) (150) may be a touch input device such as a keyboard, mouse, pen, or trackball, a voice input device, a scanning device, or another device that provides input to the computing environment (100). For video encoding, the input device(s) (150) may be a video card, TV tuner card, or similar device that accepts video input in analog or digital form, or a CD-ROM or CD-RW that reads video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, or other carrier.

The techniques and tools can be described in the general context of computer-readable media. Computer-readable media are any available tangible media that can be accessed within a computing environment. By way of example, and not limitation, with the computing environment (100), computer-readable media include memory (120), storage (140), and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "select" to describe computer operations in a computing environment. These terms are high-level abstractions for operations performed by a computer, and should not be confused with acts performed by a human being. The actual computer operations corresponding to these terms vary depending on implementation.

II. Example Network Environments.

Figure 2A:
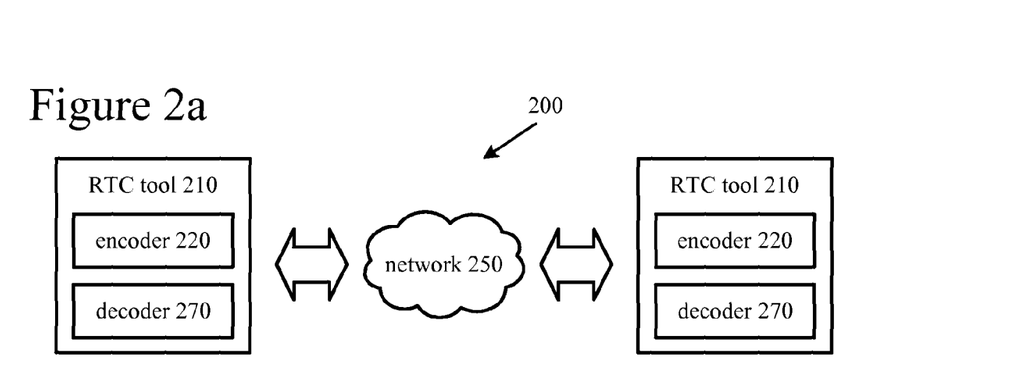
FIGS. 2a and 2b are diagrams of example network environments in which some described embodiments can be implemented.
Figure 2B:
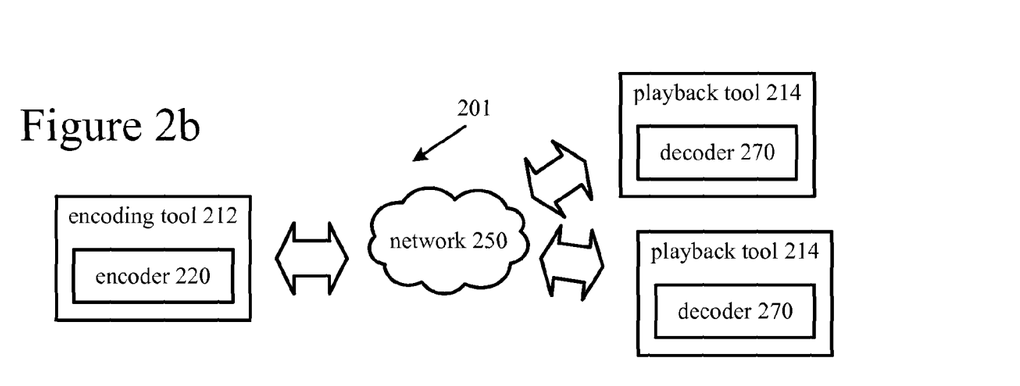

FIGS. 2a and 2b show example network environments (200, 201) that include video encoders (220) and video decoders (270). The encoders (220) and decoders (270) are connected over a network (250) using an appropriate communication protocol. The network (250) can include the Internet or another computer network.

In the network environment (200) shown in FIG. 2a, each real-time communication (RTC) tool (210) includes both an encoder (220) and a decoder (270) for bidirectional communication. The bidirectional communication can be part of a video conference, video telephone call, or other two-party communication scenario. Although the network environment (200) in FIG. 2a includes two real-time communication tools (210), the network environment (200) can instead include three or more real-time communication tools (210) that participate in multi-party communication.

Figure 3:
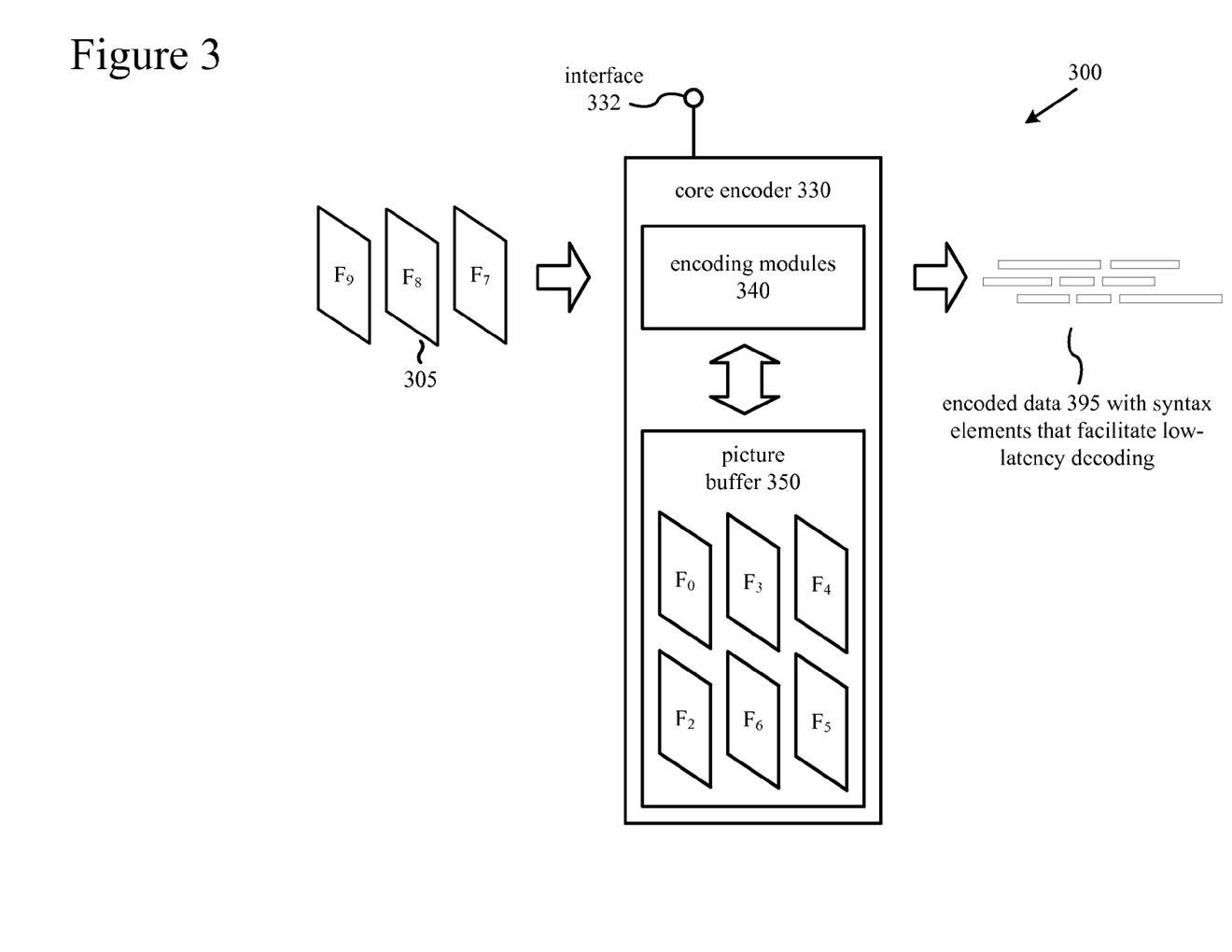
FIG. 3 is a diagram of an example encoder in conjunction with which some described embodiments can be implemented.
Figure 4:
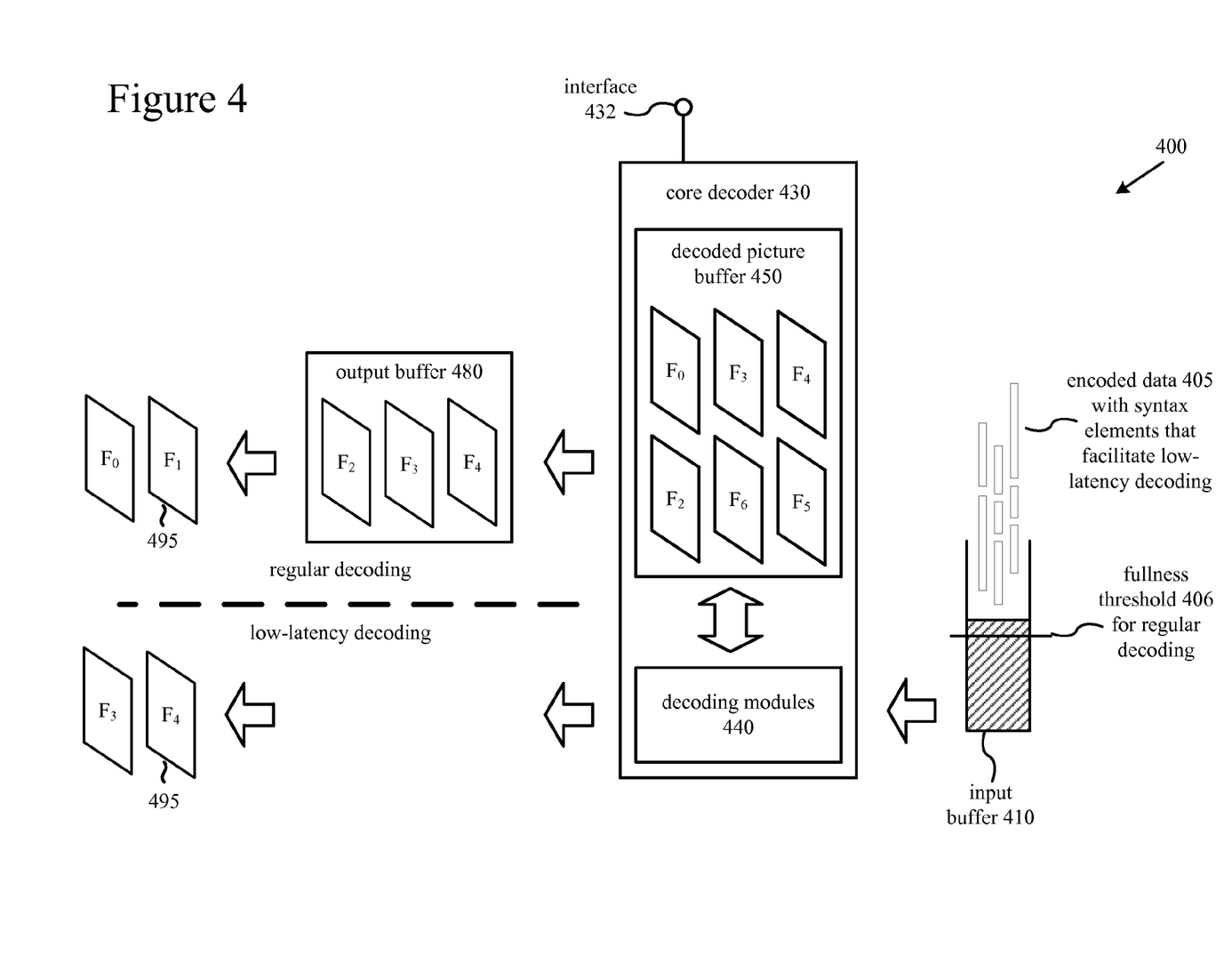
FIG. 4 is a diagram of an example decoder in conjunction with which some described embodiments can be implemented.

A real-time communication tool (210) manages encoding by an encoder (220). FIG. 3 shows an example encoder (300) that can be included in the real-time communication tool (210). Alternatively, the real-time communication tool (210) uses another encoder. A real-time communication tool (210) also manages decoding by a decoder (270). FIG. 4 shows an example decoder (400) as well as input and output buffers, which can be included in the real-time communication tool (210). Alternatively, the real-time communication tool (210) uses another decoder.

In the network environment (201) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (201) in FIG. 2b includes two playback tools (214), the network environment (201) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder (300) that can be included in the encoding tool (212). Alternatively, the encoding tool (212) uses another encoder. The encoding tool (212) can also include server-side controller logic for managing connections with one or more playback tools (214). FIG. 4 shows an example decoder (400) as well as input and output buffers, which can be included in the playback tool (214). Alternatively, the playback tool (214) uses another decoder. A playback tool (214) can also include client-side controller logic for managing connections with the encoding tool (212).

In some respects, the real-time communication tool (210), encoding tool (212) and playback tool (214) are codec independent, in that they can work with any available video encoder and decoder. For example, a given encoder (220) can produce output compliant with the SMPTE 421M standard (also known as VC-1 standard), ISO-IEC 14496-10 standard (also known as H.264 or AVC), another standard, or a proprietary format, with a corresponding decoder (270) accepting encoded data from the encoder (220).

In other respects, the real-time communication tool (210), encoding tool (212) and playback tool (214) are codec dependent, in that decisions they make can depend on bitstream syntax for a particular standard or format. For example, the use of syntax elements to mark picture boundaries or the use of a syntax element to indicate a maximum frame count value may be specific to a given standard or format.

III. Example Encoders.

FIG. 3 is a block diagram of an example encoder system (300) in conjunction with which some described embodiments may be implemented. The encoder system (300) receives a sequence of source video pictures (305) and produces encoded data (395) in a bitstream as output to storage, a buffer, or a communications connection. The encoded data (395) includes syntax elements that facilitate low-latency decoding.

The term "picture" generally refers to source, coded or reconstructed image data. For progressive video, a picture is a progressive video frame. For interlaced video, a picture may refer to an interlaced video frame, the top field of the frame, or the bottom field of the frame, depending on the context. A source video picture, generally, is a video picture from a video source such as a camera, storage media or communication connection. FIG. 3 shows input frames $F_7$, $F_8$ and $F_9$ in display order.

The encoder system (300) can include a pre-processor (not shown) that performs pre-processing (e.g., filtering) of video picture before encoding. The encoding system (300) includes a core encoder (330) that compresses the video pictures (305) and outputs a bitstream of encoded data (395). Generally, the core encoder (330) includes multiple encoding modules (340) that perform encoding tasks such as motion estimation and compensation, frequency transforms, quantization and entropy coding, as well as decoding tasks to reconstruct reference pictures that are used in motion estimation and compensation. The picture buffer (350) stores reconstructed pictures for use in motion estimation and compensation. FIG. 3 shows reconstructed frames $F_0$, $F_2$, $F_3$, $F_3$, $F_4$ and $F_6$ in the picture buffer (350). The exact operations performed by the core encoder (330) and encoding modules (340) can vary depending on compression format. The format of the output bitstream can be a Windows Media Video format, VC-1 format, MPEG-x format (e.g., MPEG-1, MPEG-2, or MPEG-4), H.26x format (e.g., H.261, H.262, H.263, or H.264), or other format.

In a closed end-to-end system, a decoder and the encoder system (300) can be configured to use additional features that extend or deviate from the compression format. In particular, the output bitstream from the encoder system (300) can include additional syntax elements that facilitate low-latency decoding. For example, the bitstream includes a frame count syntax element and/or auxiliary delimiter syntax elements, which a corresponding decoder can use to reduce the latency of decoding.

The encoder system (300) can be a general-purpose encoding tool capable of operating in any of multiple encoding modes such as a low-latency encoding mode for real-time communication, transcoding mode, and regular encoding mode for media playback from a file or stream. The core encoder (330) can be implemented as an operating system module, as part of an application library or as a standalone application.

In FIG. 3, the core encoder (330) exposes an interface (332) through which other software (e.g., a real-time communication tool, media encoding tool) can control selection of an encoding mode for the encoder system (300). For example, the other software can set or not set a low-latency mode flag that in turn controls other encoding parameters/operations. If the low-latency mode flag is set, the core encoder (330) inserts auxiliary delimiter system elements at picture boundaries in the bitstream and signals a frame count syntax element in the bitstream to control DPB output timing. In low-latency mode, the core encoder (330) can also make various encoding decisions consistent with low-latency encoding and decoding. For example, the core encoder (330) sets coding types such that pictures follow a GOP arrangement such as I P P P I P P P . . . in which an I picture (having only intra-coded content) is followed by one or more P pictures (each having forward-predicted content that references a preceding picture), but no picture content references a later picture in display order. If the low-latency mode flag is not set, the core encoder (330) does not signal auxiliary delimiter syntax elements to indicate picture boundaries. More generally, through the interface (332) the other software can control other encoding parameters or settings for the encoder system (300).

IV. Example Decoders.

FIG. 4 is a block diagram of an example decoder system (400) in conjunction with which some described embodiments may be implemented. The decoder system (400) receives encoded data (405) in a bitstream and produces reconstructed pictures (495) as output for display, storage or a communications connection. The encoded data (405) includes syntax elements that facilitate low-latency decoding.

The decoding system (400) includes an input buffer (410) that receives encoded data (405) (e.g., from a network connection) and temporarily stores the encoded data (405). By default, in regular decoding scenarios, the input buffer (410) temporarily stores encoded data (405) until a fullness threshold (406) is reached. At that point, encoded data (405) is transferred from the input buffer (410) to the core decoder (430) on a picture-by-picture basis (in coded order). As decoding continues, new encoded data is added to the input buffer and the oldest encoded data remaining in the input buffer is transferred to the decoder.

For regular decoding scenarios, the input buffer (410) smoothes out fluctuations in network delivery rate (e.g., caused by changes in network bandwidth), smoothes out variations in input intervals between pictures in the video sequence, and/or smoothes out fluctuations in coded size of pictures (e.g., caused by differences in complexity of the respective pictures). The fullness threshold (406) can be set depending on expected data rate for the bitstream and/or size of the buffer (410). The input buffer (410) thus introduces delay in decoding and playback, with the goal of improving the smoothness of playback such that playback is not interrupted once it starts. Delay introduced by the input buffer (410) can also provide the decoder (430) with the opportunity to use additional decoding resources for multi-threaded decoding. In low-latency decoding scenarios, the delay introduced by the input buffer (410) can be significantly reduced.

The decoding system (400) includes a core decoder (430) that decompresses the encoded data (405) and outputs reconstructed pictures (495). Generally, the core decoder (430) includes multiple decoding modules (440) that perform decoding tasks such as entropy decoding, inverse quantization, inverse frequency transforms and motion compensation. The DPB (450) stores reconstructed pictures for use in motion compensation. FIG. 4 shows reconstructed frames $F_0$, $F_2$, $F_3$, $F_3$, $F_4$ and $F_6$ in the picture buffer (450). The exact operations performed by the core decoder (430) and decoding modules (440) can vary depending on compression format. The format of the input bitstream can be a Windows Media Video format, VC-1 format, MPEG-x format (e.g., MPEG-1, MPEG-2, or MPEG-4), H.26x format (e.g., H.261, H.262, H.263, or H.264), or other format.

The DPB (450) temporarily stores reconstructed pictures for use in motion compensation. In regular video decoding and playback, by default, reconstructed pictures are output from the DPB (450) as soon as the DPB (450) is full. The rules for output timing depend on the size of the DPB (450) (e.g., as indicated with a syntax element in the bitstream) and other syntax elements in the bitstream (e.g., picture order count syntax elements). For example, the DPB (450) buffers 10 frames before outputting any frames to the output buffer (480). The DPB (450) thus adds delay before playback begins. In contrast, in low-latency decoding scenarios, output timing can depend on a frame count syntax element in the bitstream, and reconstructed pictures can be output from the DPB (450) before the DPB (450) is full.

The output buffer (480) temporarily stores reconstructed pictures after decoding. The output buffer (480) fills with reconstructed pictures until the default number of pictures is reached, at which point reconstructed pictures are output in display order. As decoding continues, new reconstructed pictures are added to the output buffer (480) and the oldest reconstructed picture remaining in the output buffer (480) is output for display.

For regular decoding scenarios, the buffering of reconstructed pictures helps smooth out fluctuations in decoding time for the respective pictures (e.g., due to differences in decoding complexity). The output buffer delay is, for example, a constant number of pictures set by the decoder. FIG. 4 shows three frames $F_2$, $F_3$, and $F_4$ buffered in the output buffer (480) for regular decoding. The output buffer (480) thus introduces delay with the goal of improving the smoothness of playback such that playback is not interrupted once it starts. In low-latency decoding scenarios, the delay introduced by the output buffer (480) can be significantly reduced, or the output buffer (480) is bypassed. FIG. 4 shows no output buffer (480) for low-latency decoding, so playback begins three frames sooner.

In a closed end-to-end system, the decoder system (400) and an encoder can be configured to use additional features that extend or deviate from the compression format. In particular, the input bitstream to the decoder system (400) can include additional syntax elements that facilitate low-latency decoding. For example, the bitstream includes a frame count syntax element and/or auxiliary delimiter syntax elements, which a corresponding decoder can use to reduce the latency of decoding. As part of a closed end-to-end system, the decoder system (400) operates with the understanding that the encoder will encode video suitable for low-latency decoding and include syntax elements in the bitstream usable for low-latency decoding. In some implementations, a decoder outside of the closed end-to-end system can ignore such additional syntax elements and still decode the encoded data.

The decoder system (400) can be a general-purpose decoding tool capable of operating in any of multiple decoding modes such as a low-latency decoding mode for real-time communication, a transcoding mode, and a regular decoding mode for media playback from a file or stream. The core decoder (430) can be implemented as an operating system module, as part of an application library or as a standalone application.

In FIG. 4, the core decoder (430) exposes an interface (432) through which other software (e.g., a real-time communication tool, media playback tool) can control selection of a decoding mode for the decoder system (400). For example, the other software can set or not set a low-latency mode flag that in turn controls other decoding parameters/operations. If the low-latency mode flag is set, the core decoder (430) controls DPB output timing according to a frame count syntax element, checks for auxiliary delimiter syntax elements to identify picture boundaries, and disables or reduces delay for jitter buffers. If the low-latency mode flag is not set, the core decoder (430) uses default timing for DPB output according to conventional playback settings, identifies picture boundaries using slice-layer syntax elements, and uses default jitter buffer delay values. As another example, through the interface (432), the other software can separately set the number of pictures in flight for decoding. More generally, through the interface (432) the other software can control other decoding parameters or settings for the decoder system (400) depending on the decoding mode or independent of the decoding mode.

V. Low-latency Decoding Adaptations.

With techniques and tools described herein, decoding latency is decreased by reducing or even eliminating delay at one or more different stages of decoding, so as to reduce or completely eliminate sources of delay in overall decoding, compared to decoding that is initially optimized for smoothness of media playback and utilization of decoding resources.

A. Reducing Output Delay from DPB.

The H.264 standard implies that the timing of output from the DPB should depend on DPB size and picture order count information. Conventionally, a H.264 decoder starts to output pictures after the DPB is full, which introduces delay before playback begins, but provides for reliable playback.

For low-latency video decoding and playback, a decoder can instead use a frame count syntax element to control the timing of output from the DPB. Using the frame count syntax element to set initial output delay from the DPB helps reduce latency. In particular, using the frame count syntax element, output of pictures from the DPB can begin before the DPB is full, but can still provide conformant decoding (i.e., decoding all pictures such that the pictures are bit-exact matches of pictures decoded using another, conventional scheme). This significantly reduces delay when the delay (in frames) indicated by the frame count syntax element is much lower than the size (in frames) of the DPB.

Generally, the frame count syntax element indicates a frame reordering delay. The frame reordering delay corresponds to a maximum count of frames that can precede a given frame in coded order (or decoding order) but follow the given frame in display order (or output order). The initial delay before output from the DPB is set depending on the value of the frame count syntax element. For example, if the frame count syntax element is zero (which means no picture can reference a later picture in display order for purposes of decoding), the initial DPB delay is zero frames. Or, if the frame count syntax element is two, the initial DPB delay is two frames.

Figure 5:
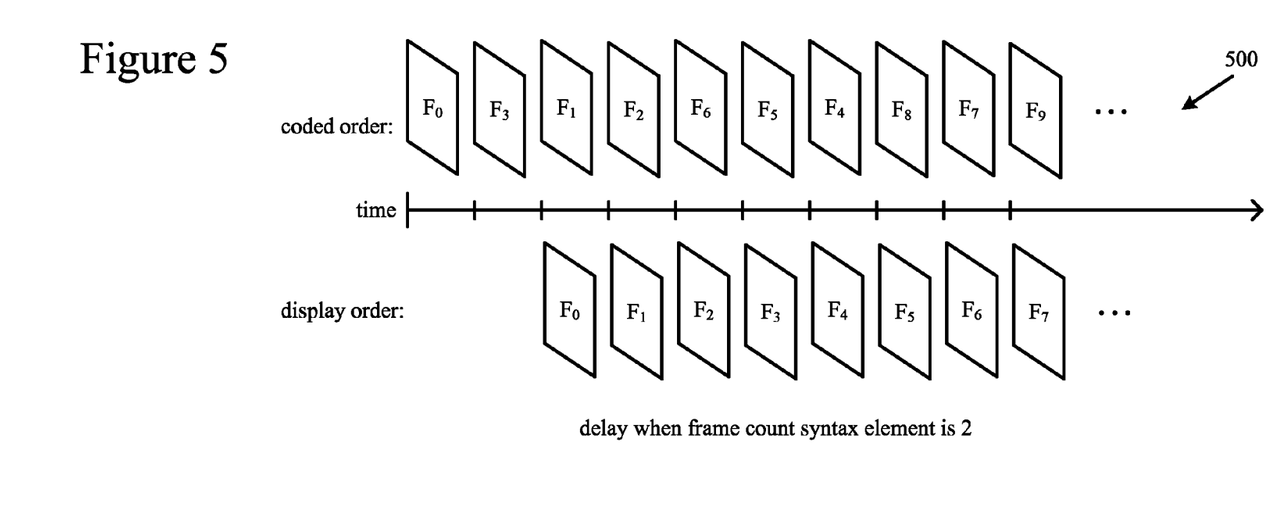
FIG. 5 is a diagram showing coded order and display order for pictures in an example series, subject to delay consistent with a frame count syntax element.

FIG. 5 shows coded order and display order for an example series (500) of frames. The display order of the frames is their numeric order $F_0$, $F_1$, $F_2$, . . . , and generally corresponds to their original order. The coded order of the frames is $F_0$, $F_3$, $F_1$, $F_2$, $F_6$, $F_5$, $F_4$, $F_8$, $F_7$, and $F_9$. This means $F_0$ is decoded first, followed by $F_3$, which may depend on $F_0$. Next, $F_1$ and $F_2$ are decoded. Even though $F_3$ is later in display order, $F_3$ is decoded before $F_1$ and $F_2$ because the decoding of $F_1$ and $F_2$ may use a reconstructed version of $F_3$. Similarly, $F_5$ and $F_4$ follow $F_6$ in coded order and may depend on $F_6$ (or, in theory, any other preceding frame in coded order). In the example of FIG. 5, two frames $F_5$ and $F_6$ precede $F_4$ in coded order but follow $F_4$ in output order, which is valid when the frame reordering delay is two.

For the example series (500) in FIG. 5, the initial delay for output from the DPB is two frames. $F_0$ is output from the DPB when $F_1$ is decoded and added to the DPB, $F_1$ is output from the DPB when $F_2$ is decoded and added to the DPB, $F_2$ is output from the DPB when $F_6$ is decoded and added to the DPB, and so on. Given the initial delay of two frames, the frames $F_0$ to $F_9$ are available for output from the DPB at appropriate times.

In contrast, if the initial output delay were reduced to one frame, $F_0$ would be output from the DPB when $F_3$ is decoded and added to the DPB. $F_1$, $F_2$ and $F_3$ would similarly be correctly output, but $F_4$ would not be ready for output in time. This is because two frames $F_5$ and $F_6$ precede $F_4$ in coded order but follow $F_4$ in output order.

In implementations that use H.264 decoding, the frame count syntax element is the num_reorder_frames syntax element. The num_reorder_frames syntax element is signaled as a VUI parameter for a video sequence. The num_reorder_frames syntax element indicates the maximum number of frames (or field pairs or non-paired fields) that precede any frame (or complementary field pair or non-paired field) in the video sequence in decoding order but follow it in output order. Alternatively, for another format or standard, the frame count syntax element is another syntax element that is appropriate for the other format or standard.

The num_reorder_frames syntax element is not mandatory, and an H.264 encoder can in theory assign an arbitrary value to the num_reorder_frames syntax element. (If the syntax element is not present, a decoder assigns a default value according to rules specified in the H.264 standard.) As such, in general a decoder cannot depend on the num_reorder_frames syntax element being present and set with a meaningful value. In typical real-time communication scenarios, however, the encoder and decoder are part of a closed system. The encoder can therefore assign a meaningful value for the num_reorder_frames syntax element, consistent with decisions made during encoding about dependencies between pictures, with the understanding the decoder will use the value to reduce latency in picture output from the DPB. In this way, the encoder and decoder replace the conventional mechanism used for DPB output timing with a lower-latency mechanism to control timing of output from the DPB.

In other decoding modes, the decoder can still use DPB size and picture order count information to control the timing of output from the DPB according to conventional DPB management rules. In some cases, the DPB stores 7-16 frames before outputting any of the frames for display.

B. Auxiliary Delimiter Syntax Elements.

According to the H.264 standard, a decoder uses slice-layer parameters to detect boundaries between encoded data for different pictures in the bitstream. To detect the end of a current picture, the decoder scans ahead in the bitstream to evaluate encoded data for the next slice. If the next slice is part of the current picture, the decoder continues scanning ahead in the bitstream to find the picture boundary. When the decoder finds a next slice that is not part of the current picture, the decoder has detected the end of the current picture and beginning of the next picture. Detecting picture boundaries in this way involves buffering and scanning of one additional unit of encoded data for the slice of a next picture in order to detect the end of the current picture, which introduces one additional picture's delay in decoding.

For low-latency video decoding and playback, a decoder can instead use auxiliary delimiter syntax elements to detect boundaries between encoded data for different pictures in the bitstream. An encoder inserts auxiliary delimiter syntax elements in the bitstream at appropriate locations, and the decoder scans ahead to identify picture boundaries based on the auxiliary delimiter syntax elements. For example, in implementations that use H.264 decoding, the auxiliary delimiter syntax element is a four-byte network abstraction layer (NAL) unit having a NAL unit type of 9, which marks the NAL unit as a auxiliary unit delimiter (AUD). Alternatively, for another format or standard, the auxiliary delimiter syntax element is another syntax element that is appropriate for the other format or standard. Using auxiliary delimiter syntax elements to detect picture boundaries can reduce delay by avoiding buffering of encoded data for next slices, but introduces a small amount of additional data in the bitstream.

Figure 6:
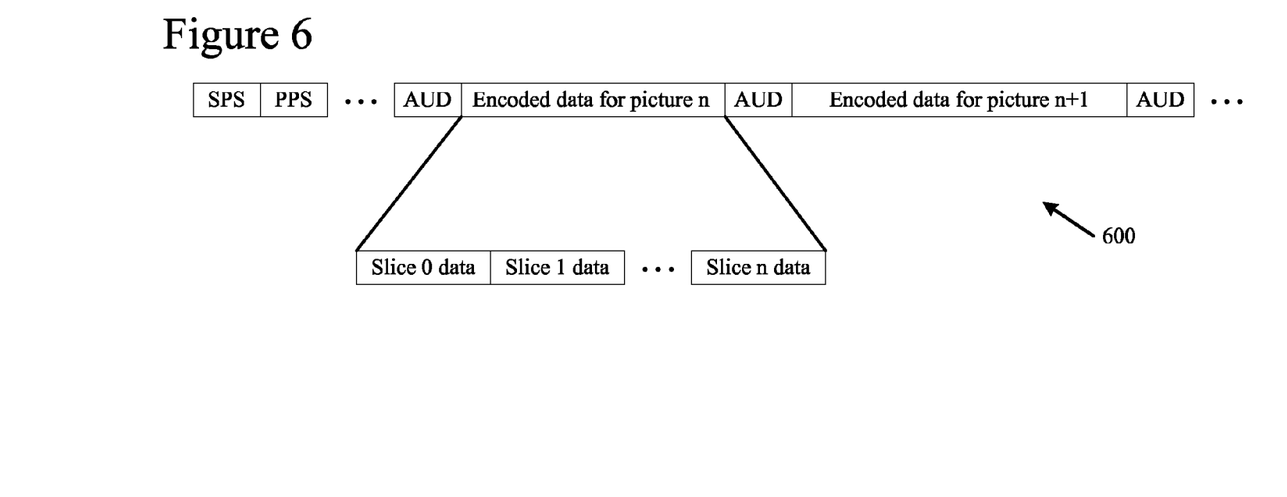
FIG. 6 is a diagram of an example bitstream that includes auxiliary delimiter syntax elements.

FIG. 6 shows an example H.264 bitstream (600) that includes auxiliary delimiter syntax elements. The bitstream (600) includes a sequence parameter set (SPS) element and picture parameter set (PPS) element as well as encoded data for pictures. For a given picture, the encoded data is in fact encoded data for the respective slices 0 . . . n for the picture. The bitstream (600) includes AUD syntax elements that mark the boundaries between the encoded data for the respective pictures.

The H.264 standard does not specify that NAL units with type 9 should mark picture boundaries in this way. As such, in general a decoder cannot depend on such NAL units being present to mark picture boundaries. In typical real-time communication scenarios, however, the encoder and decoder are part of a closed end-to-end system. The encoder can therefore insert auxiliary delimiter syntax elements at appropriate locations, and the decoder can reliably use the auxiliary delimiter syntax elements to detect picture boundaries. In this way, the encoder and decoder replace the conventional mechanism used for picture boundary detection with a lower-latency mechanism.

When the decoder is also able to operate in decoding modes other than a low-latency decoding mode, for regular video decoding and playback, the decoder can identify the end of a current picture and start of a next picture by scanning slice-layer syntax elements in the encoded data, using the conventional mechanism for picture boundary detection.

C. Limiting Number of Pictures in Flight.

A decoder can use multi-threading to concurrently perform different tasks during decoding, even distributing the tasks to different processing units so that more of the available computing resources are utilized. For additional details about multi-threading implementations for H.264 decoding, see, e.g., U.S. Patent Application Publication No. 2009/0003447.

Generally, the term "number of pictures in flight" indicates the maximum number of different pictures for which decoding tasks can be concurrently performed during decoding. For example, if decoding allows four pictures in flight, decoding tasks for up to four pictures can be performed concurrently. Having one picture in flight may result in under-utilization of computing resources, since decoding tasks for the picture are often stalled pending the completion of other decoding task for the picture. Having more pictures in flight tends to provide more opportunities to utilize available computing resources, since there are likely to be more decoding tasks ready for processing. Having multiple pictures in flight introduces decoding delay, however.

In example multi-threading implementations, for regular video decoding and playback, the number of pictures in flight is set to efficiently utilize available computing resources, at the cost of delay due to multiple pictures in flight during decoding. For low-latency decoding, the number of pictures in flight is set to a lower number, or even set to one. When the number of pictures in flight is set to 1, the decoder may still be able to distribute different decoding tasks for a picture between multiple processing cores, if such decoding tasks do not have dependencies between them. In most cases, however, reducing the number of pictures in flight hurts resource utilization while reducing delay.

D. Jitter Buffer Utilization.

As shown in FIG. 4, a decoder typically uses one or more jitter buffers to improve multi-threading performance and/or improve the smoothness of playback. Generally, a jitter buffer adds delay for the sake of smoothing out fluctuations in input to the buffer.

For regular video decoding and playback, a decoder can use an input buffer set to a default value. The input buffer fills with encoded data until a threshold fullness is reached, at which point encoded data is transferred on a picture-by-picture basis (in coded order) to the decoder for decoding. For example, the threshold fullness value corresponds to encoded data for eight frames at the average bitrate for the sequence, which adds expected delay of roughly eight frames to overall decoding. Input buffering before decoding thus adds delay, but tends to improve utilization of decoding resources and make playback smoother.

For low-latency decoding, a decoder can reduce delay introduced by the input buffer. For example, the threshold fullness value for the input buffer is reduced. Or, as soon as encoded data for a given picture is available in the input buffer, the encoded data for the picture is transferred to the decoder for decoding. In this case, the decoder does not wait until a fixed threshold fullness is reached to ensure smooth playback experience.

As to use of an output buffer after decoding, for regular video decoding and playback, a decoder can use an output buffer set to a default size. The output buffer stores n reconstructed pictures. For example, the output buffer stores three reconstructed frames by default, which adds a constant delay of three frames. Again, the output buffering after decoding adds delay, but tends to improve utilization of decoding resources and make playback smoother. For low-latency decoding, a decoder can reduce delay introduced by the output buffer. For example, the number of reconstructed pictures stored in the output buffer can be reduced, or the output buffer can be bypassed/removed.

E. Results.

The foregoing mechanisms can be used in combination to reduce decoding delay. For example, an encoder sets the frame count syntax element to zero (in which case, for a current picture, motion compensation does not use any later picture in display order as a reference picture) and inserts auxiliary delimiter syntax elements for picture boundary detection. A corresponding decoder controls DPB output timing using the frame count syntax element, detects picture boundaries using auxiliary delimiter syntax elements, sets the number of pictures in flight to one, removes encoded data for a picture from the input buffer as soon as available, and uses no output buffer for reconstructed pictures. In example implementations on a quad-core machine, with these changes, decoding delay is reduced from $(W-1)+X+Y+(Z-1)$ frames of delay to zero frames of delay. X indicates delay (in frames) in input buffering, where X could be 0 to 8. Y indicates delay (in frames) in output buffering, where Y could be 0 to 8. Z indicates delay (in frames) due to buffering in the DPB, where Z could be 1 to 16. $W-1$ is delay due to the number of pictures in flight, where W is 1 to 16. In short, $X+Y+(Z-1)+(W-1)$ could be up to $8+8+15+15=46$ frames of delay. In contrast, with all settings to reduce delay for low-latency mode as described herein, delay could be 0 frames (for one frame in flight). However, with such minimal-delay settings, multi-threaded decoding shows a performance loss of 20-30%. Delay can be introduced, of course, to improve resource utilization in multi-threaded decoding.

VI. Encoding with Adaptations for Low-latency Decoding.

Figure 7:
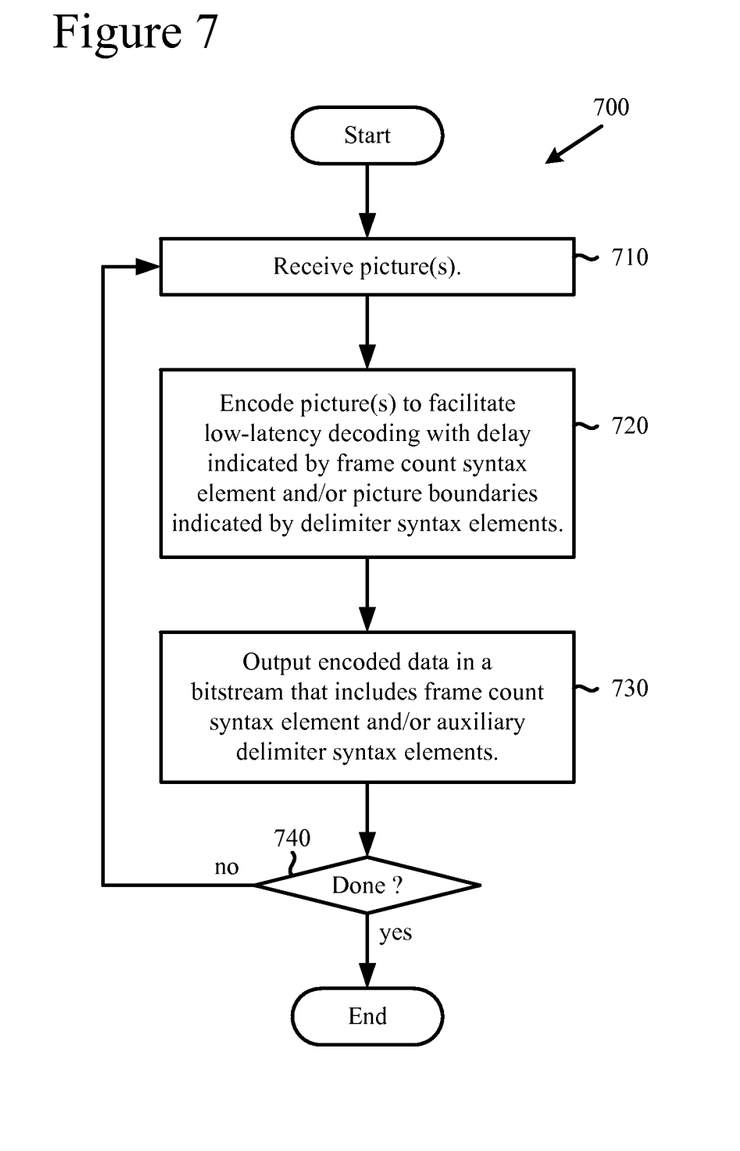
FIG. 7 is a flowchart showing an example technique for encoding video in a way that facilitates low-latency decoding.

FIG. 7 shows an example technique (700) for encoding with adaptations for low-latency decoding. For example, a real-time communication tool or encoding tool described with reference to FIGS. 2a and 2b performs the technique (700). Alternatively, another tool performs the technique (700).

To start, the tool receives (710) one or more pictures for a video sequence. For example, the tool receives pictures in display order from a video source such as a camera or other capture device, storage media, or communication connection.

The tool encodes (720) the one or more pictures to produce encoded data in a bitstream, where the encoding (720) facilitates low-latency decoding. For example, as part of the encoding (720), the tool sets inter-picture dependencies that are consistent with a frame reordering delay set for the sequence. Or, as part of the encoding (720), the tool inserts auxiliary delimiter syntax elements in the bitstream to indicate picture boundaries. Alternatively, the encoding facilitates low-latency decoding in other and/or additional ways.

The tool outputs (730) the encoded data in a bitstream. The bitstream can include a frame count syntax element that indicates the frame reordering delay, auxiliary delimiter syntax elements at picture boundaries and/or other syntax elements added to facilitate low-latency decoding.

The tool checks (740) whether encoding is done and, if not, continues with the next picture(s) in the sequence. For the sake of presentation, FIG. 7 shows repetition of the technique (700) on a picture-by-picture basis or for groups of pictures. Alternatively, the technique is repeated on some other basis. In any case, encoding decisions that affect an entire sequence (e.g., frame count syntax element) can be signaled for the entire sequence.

VII. Adaptations for Low-Latency Decoding.

Figure 8:
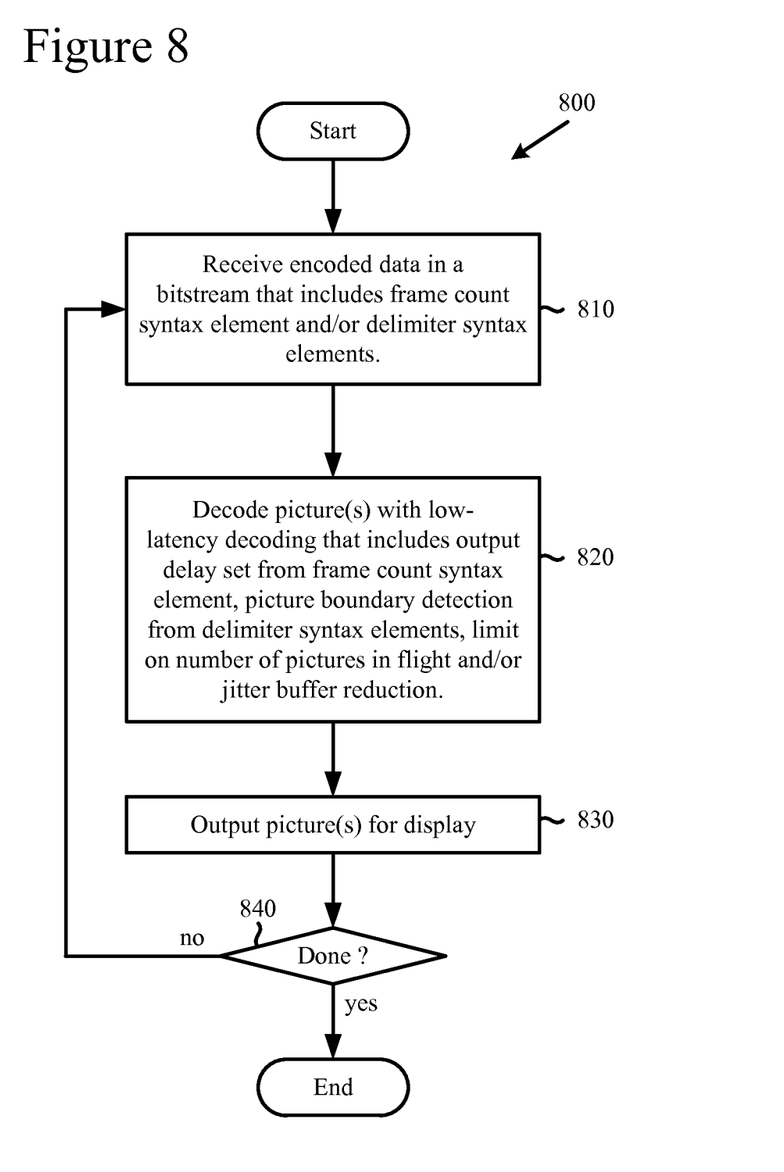
FIG. 8 is a flowchart showing an example technique for low-latency decoding.

FIG. 8 shows an example technique (800) for low-latency decoding. For example, a real-time communication tool or playback tool described with reference to FIGS. 2a and 2b performs the technique (800). Alternatively, another tool performs the technique (800).

To start, the tool receives (810) encoded data in a bitstream. The bitstream can include a frame count syntax element that indicates the frame reordering delay, auxiliary delimiter syntax elements at picture boundaries and/or other syntax elements added to facilitate low-latency decoding.

The tool decodes (820) one or more pictures using one or more low-latency decoding mechanisms as described in section V. For example, the tool uses a frame count syntax element in the bitstream to determine an initial output delay for a DPB. Or, the tool uses auxiliary delimiter syntax elements to detect picture boundaries in the bitstream. Or, the tool sets the number of pictures in flight to one, thereby limiting how many pictures can be concurrently decoded. Or, the tool sets jitter buffer utilization for a jitter buffer to favor overall latency reduction over smoothness of playback. Alternatively, the tool uses other and/or additional low-latency decoding mechanisms.

The tool outputs (830) the one or more decoded pictures for display. When the tool has determined an initial output delay from a frame count syntax element, the tool outputs (830) the pictures subject to that initial output delay.

The tool checks (840) whether decoding is done and, if not, continues with decoding for the next picture(s) in the sequence. For the sake of presentation, FIG. 8 shows repetition of the technique (800) on a picture-by-picture basis or for groups of pictures. Alternatively, the technique is repeated on some other basis. In any case, decoding decisions that affect decoding for an entire sequence (e.g., determining delay from a frame count syntax element, setting jitter buffer utilization, setting number of pictures in flight) can be made for the entire sequence.

VIII. Selection Between Multiple Encoding Modes.

Figure 9:
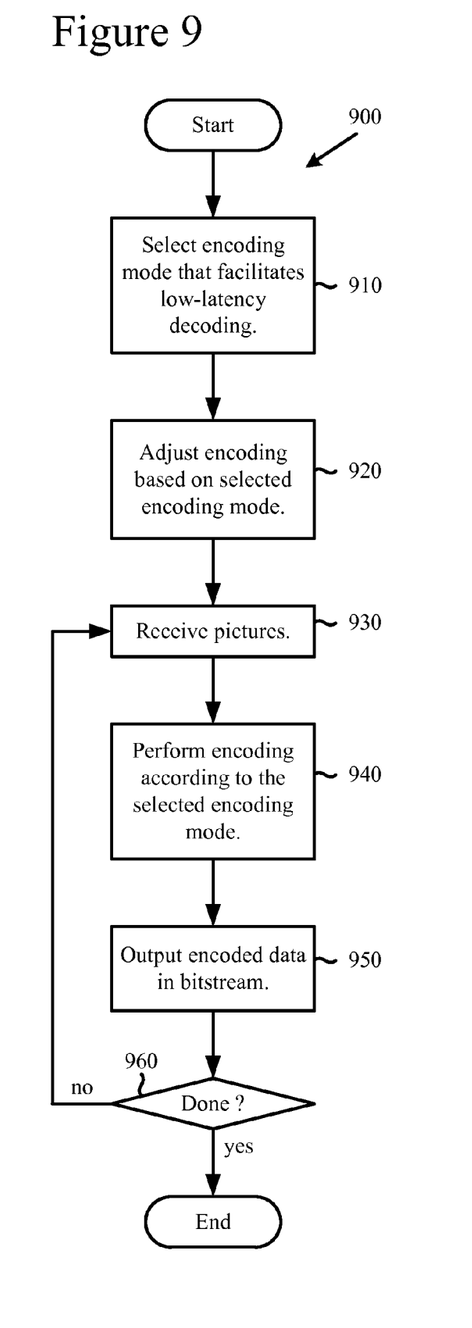
FIG. 9 is a flowchart showing an example technique for selectively encoding video in a way that facilitates low-latency decoding.

FIG. 9 shows an example technique (900) for selectively encoding in a mode that facilitates low-latency decoding. For example, a real-time communication tool or encoding tool described with reference to FIGS. 2a and 2b performs the technique (900). Alternatively, another tool performs the technique (900).

To start, the tool selects (910) an encoding mode that facilitates low-latency decoding, which is characterized by lower latency decoding, compared to results produced according to another encoding mode. The tool adjusts (920) encoding based at least in part on the selected encoding mode. For example, the tool adjusts encoding for output timing determination and/or picture boundary detection by a decoder. Alternatively, the tool adjusts encoding in other and/or additional ways based on the selected encoding mode.

The tool receives (930) one or more pictures, performs (940) encoding according to the selected encoding mode, and outputs (950) encoded data in a bitstream. The tool checks (960) whether encoding is done and, if not, continues with encoding for the next picture(s) in the sequence.

For encoding that facilitates low-latency decoding, as part of the encoding (940), the tool facilitates use of one or more low-latency decoding mechanisms as described in section V. For example, for output timing determination, the tool inserts a frame count syntax element in the bitstream that indicates a frame reordering delay, and the tool sets inter-picture dependencies that are consistent with the permitted frame reordering delay. Or, for picture boundary detection, the tool inserts auxiliary delimiter syntax elements to mark picture boundaries in the bitstream. Alternatively, as part of the encoding (940), the tool facilitates use of other and/or additional low-latency decoding mechanisms. The output bitstream can include a frame count syntax element that indicates the frame reordering delay, auxiliary delimiter syntax elements at picture boundaries and/or other syntax elements added to facilitate low-latency decoding.

On the other hand, for another encoding mode, as part of the encoding (940), the tool uses conventional encoding mechanisms.

IX. Selection Between Multiple Decoding Modes.

Figure 10:
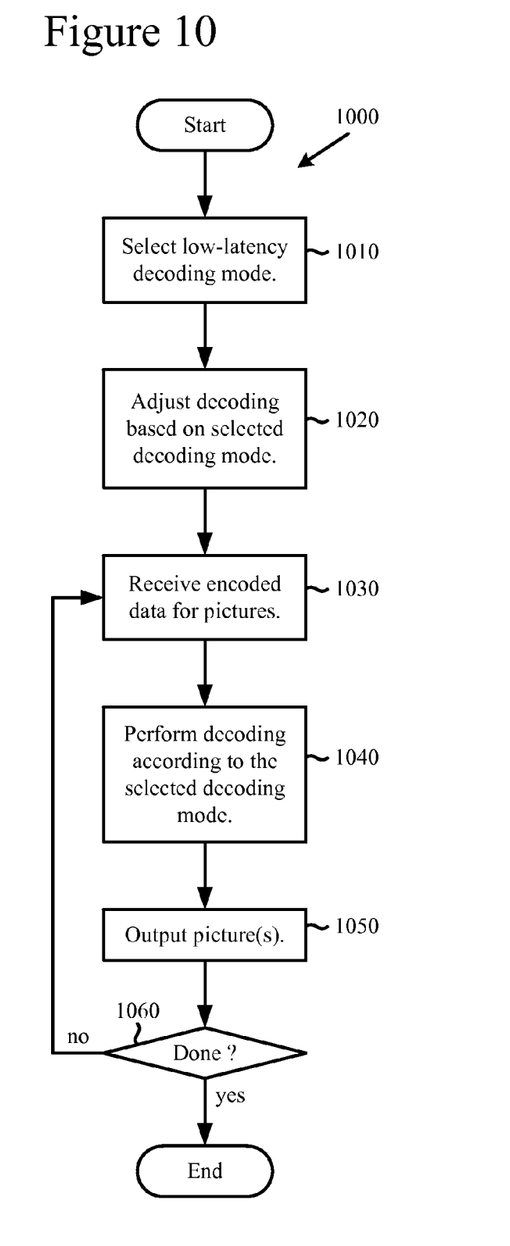
FIG. 10 is a flowchart showing an example technique for selectively decoding video in a low-latency decoding mode.

FIG. 10 shows an example technique (1000) for selectively using a low-latency decoding mode. For example, a real-time communication tool or playback tool described with reference to FIGS. 2*a* and 2*b* performs the technique (1000). Alternatively, another tool performs the technique (1000).

To start, the tool selects (1010) a low-latency decoding mode that is characterized by lower latency decoding compared to another decoding mode. The tool adjusts (1020) decoding based at least in part on the selected decoding mode. For example, the tool adjusts any combination of output timing determination, picture boundary detection, number of pictures in flight and jitter buffer utilization. Alternatively, the tool adjusts decoding in other and/or additional ways based on the selected decoding mode.

The tool receives (1030) encoded data in a bitstream and performs (1040) decoding according to the selected decoding mode. The decoding produces one or more reconstructed pictures, which the tool outputs (1050). The tool checks (1060) whether decoding is done and, if not, continues with decoding for the next picture(s) in the sequence.

For low-latency decoding, the bitstream can include a frame count syntax element that indicates frame reordering delay, auxiliary delimiter syntax elements at picture boundaries and/or other syntax elements added to facilitate low-latency decoding. As part of the decoding (1040), the tool uses one or more low-latency decoding mechanisms as described in section V. For example, for output timing determination, the tool uses a frame count syntax element in the bitstream to determine a frame reordering delay, which the tool uses to set an initial output delay for a DPB. Or, for picture boundary detection, the tool uses auxiliary delimiter syntax elements to detect picture boundaries in the bitstream. Or, the tool sets the number of pictures in flight to one, such that a single picture in flight is permitted for decoding. Or, for jitter buffer utilization, the tool sets utilization for an input buffer and/or output buffer to favor overall latency reduction over smoothness of playback. Alternatively, as part of the decoding (1040) in a low-latency decoding mode, the tool uses other and/or additional low-latency decoding mechanisms. When the tool has determined an initial output delay from a frame count syntax element, the tool outputs (1050) the picture(s) subject to the initial output delay.

On the other hand, for another decoding mode, as part of the decoding (1040), the tool uses conventional decoding mechanisms. For example, for output timing determination, the tool uses DPB size and picture order count information to manage a DPB and control the timing of output from the DPB. Or, for picture boundary detection, the tool detects picture boundaries using slice-layer syntax elements. Or, the tool sets the number of pictures in flight to two, three or more pictures. Or, for jitter buffer utilization, the tool sets utilization for an input buffer and/or output buffer to favor smoothness of playback over overall latency reduction.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computing device that implements a video decoder, a method comprising:
    selecting a low-latency decoding mode characterized by lower latency decoding compared to another decoding mode;
    based at least in part on the selected low-latency decoding mode, adjusting one or more of output timing determination, picture boundary detection, number of pictures in flight and jitter buffer utilization, wherein the number of pictures in flight is adjusted such that a single picture in flight is permitted for decoding;
    receiving encoded data in a bitstream for a video sequence;
    with the computing device that implements the video decoder, decoding at least some of the encoded data according to the selected low-latency decoding mode to reconstruct a picture of the video sequence; and
    outputting the picture for display.

2. The method of claim 1 wherein the output timing determination is adjusted, wherein a frame count syntax element in the bitstream indicates a frame reordering delay, and wherein initial output delay for a decoded picture buffer depends at least in part on the frame reordering delay.

3. The method of claim 2 wherein the frame reordering delay is a maximum count of frames that can precede a given frame in coded order but follow the given frame in display order.

4. The method of claim 1 wherein the picture boundary detection is adjusted, the method further comprising,
    during the decoding, detecting a picture boundary using an auxiliary delimiter syntax element in the bitstream.

5. The method of claim 4 wherein the auxiliary delimiter syntax element is a network abstraction layer (NAL) unit having a NAL unit type.

6. The method of claim 1 wherein the jitter buffer utilization is adjusted such that a jitter buffer is set to favor overall latency reduction over smoothness of playback.

7. The method of claim 6 wherein the jitter buffer is an input buffer, and wherein the utilization of the input buffer is set so that decoding begins for a given picture as soon as the encoded data for the given picture is available in the input buffer.

8. The method of claim 6 wherein the jitter buffer is an output buffer adapted to store reconstructed pictures, and wherein the utilization of the output buffer is set so that the output buffer is bypassed.

9. The method of claim 1 further comprising, in another decoding session:
    selecting the other decoding mode;
    receiving second encoded data in a second bitstream for a second video sequence;
    with the computing device that implements the video decoder, decoding at least some of the second encoded data according to the selected other decoding mode to reconstruct a picture of the second video sequence, including detecting a picture boundary using one or more slice-layer syntax elements in the second bitstream, wherein multiple pictures in flight are permitted for the decoding of the second encoded data, and wherein jitter buffer utilization is set to favor smoothness of playback over overall latency reduction; and outputting the picture of the second video sequence for display, wherein initial output delay for a decoded picture buffer depends at least in part on size of the decoded picture buffer.

10. The method of claim 1 wherein a core decoding module performs the decoding and exposes an interface that allows other software to control the selection of the low-latency decoding mode or the other decoding mode.

11. The method of claim 10 wherein a flag indicates whether the low-latency decoding mode or the other decoding mode is selected, and wherein the flag controls the adjustment of the output timing determination, the picture boundary detection, the number of pictures in flight and/or the jitter buffer utilization.

12. The method of claim 10 wherein the interface further allows the other software to control the setting of at least one decoding parameter independent of the selection of the low-latency decoding mode or the other decoding mode.

13. A memory or storage device having stored thereon computer-executable instructions for causing a computing device programmed thereby to perform a method comprising:
  receiving plural pictures for a video sequence;
  selecting a first encoding mode or a second encoding mode from among multiple encoding modes;
  encoding the plural pictures to produce encoded data in a bitstream, wherein:
    if the first encoding mode is selected, the encoding facilitates low-latency decoding by:
      setting inter-picture dependencies that are consistent with a first value for a frame reordering delay; and
      inserting plural auxiliary delimiter syntax elements in the bitstream, wherein each of the plural auxiliary delimiter syntax elements identifies a picture boundary; and
    if the second encoding mode is selected, for regular decoding that has higher latency than the low-latency decoding, the encoding includes:
      setting inter-picture dependencies that are consistent with a second value for the frame reordering delay, wherein the second value is higher than the first value; and
      skipping insertion of the plural auxiliary delimiter syntax elements, wherein slice-layer syntax elements are usable during the regular decoding to detect picture boundaries; and
  outputting the encoded data in the bitstream, wherein the bitstream includes:
    a frame count syntax element that indicates the first value or the second value for the frame reordering delay;
    the slice-layer syntax elements; and
    if the first encoding mode is selected, the plural auxiliary delimiter syntax elements.

14. The memory or storage device of claim 13 wherein the frame reordering delay is a maximum count of frames that can precede a given frame in coded order but follow the given frame in display order.

15. The memory or storage device of claim 13 wherein each of the plural auxiliary delimiter syntax elements is a network abstraction layer (NAL) unit having a NAL unit type.

16. The memory or storage device of claim 13 wherein a core encoding module performs the encoding and exposes an interface that allows other software to control the selection of the first encoding mode or the second encoding mode.

17. A computing device that implements a video decoder, the computing device comprising one or more processing units and memory, the computing device being adapted to perform a method comprising:
  receiving encoded data in a bitstream for a video sequence, wherein the bitstream includes a frame count syntax element in video usability information, the frame count syntax element indicating a frame reordering delay, and wherein the bitstream further includes network abstraction layer (NAL) units for auxiliary delimiter syntax elements that indicate picture boundaries;
  using the frame count syntax element to determine an initial output delay for a decoded picture buffer;
  setting a number of pictures in flight to one, thereby limiting how many pictures can be concurrently decoded, wherein the video decoder is otherwise adapted to concurrently decode multiple pictures in flight;
  decoding at least some of the encoded data to reconstruct a picture of the video sequence, including detecting a picture boundary using one of the auxiliary delimiter syntax elements; and
  outputting the picture for display, wherein the initial output delay for the decoded picture buffer is set depending on the frame count syntax element.

18. The computing device of claim 17 wherein the method further comprises:
  setting jitter buffer utilization for a jitter buffer to favor overall latency reduction over smoothness of playback.

19. The computing device of claim 18 wherein the jitter buffer is an output buffer adapted to store reconstructed pictures, and wherein the utilization of the output buffer is set so that the output buffer is bypassed.

20. The computing device of claim 17 wherein the frame reordering delay is a maximum count of frames that can precede a given frame in coded order but follow the given frame in display order.

* * * * *